Nov. 19, 1929.  B. CLAVETTE  1,736,648
REFRIGERATING PLANT
Filed July 16, 1925  3 Sheets-Sheet 1
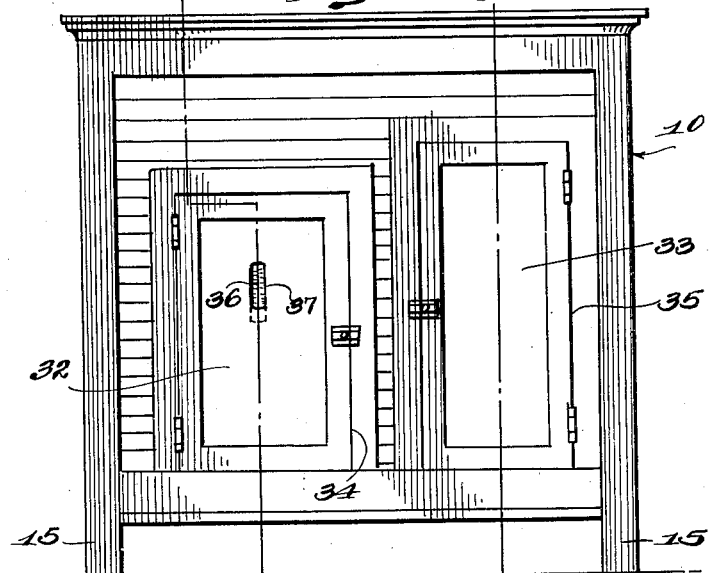
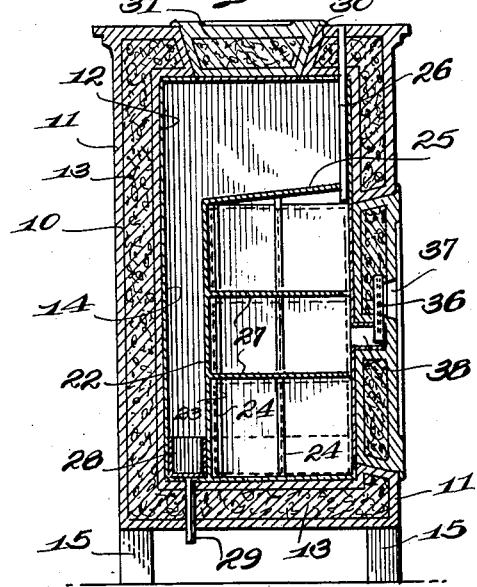 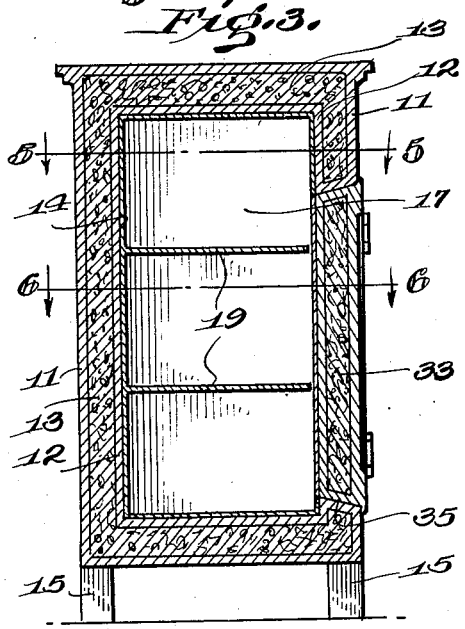
Inventor
Belonie Clavette

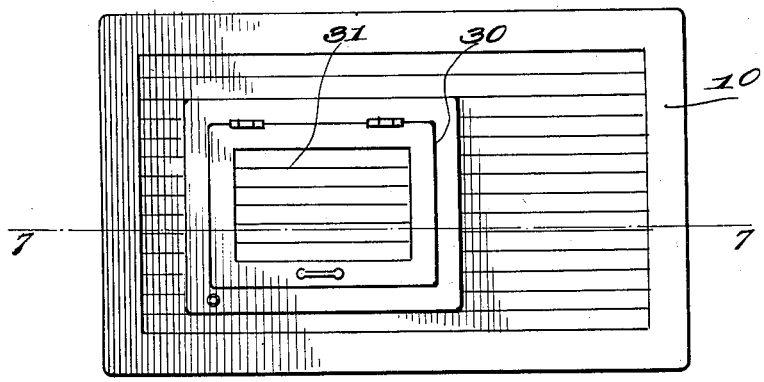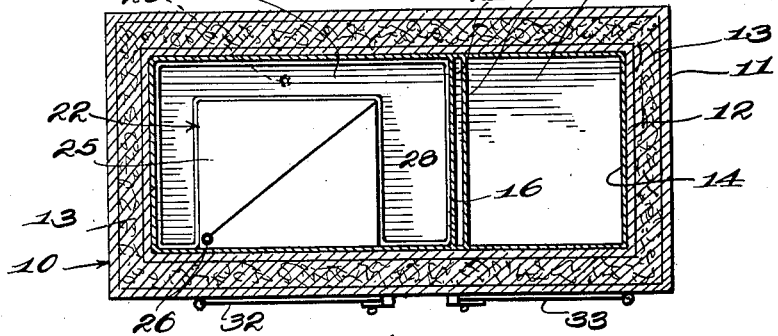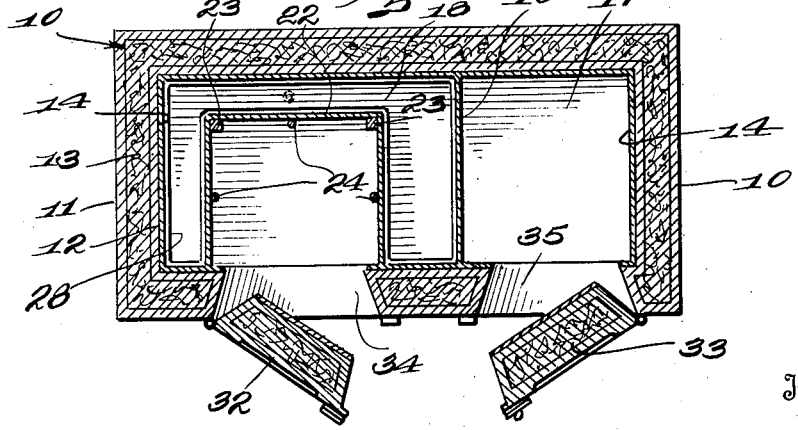

Nov. 19, 1929.                B. CLAVETTE                1,736,648
                           REFRIGERATING PLANT
                           Filed July 16, 1925          3 Sheets-Sheet 3

Fig. 7.

Inventor:-
Belonie Clavette.

By —

Attorney.

Patented Nov. 19, 1929

1,736,648

UNITED STATES PATENT OFFICE

BELONIE CLAVETTE, OF EDMUNDSTON, NEW BRUNSWICK, CANADA

REFRIGERATING PLANT

Application filed July 16, 1925. Serial No. 44,022.

This invention relates to a refrigerating plant, and aims to provide a novel and improved device of this character having an ice receiving chamber for cooling the interior of a compartment to a freezing temperature as the ice in said chamber melts.

Another object of the invention is to provide a refrigerating plant of this character in which the closed compartment in the ice chamber for receiving pans of water to be frozen is of a particular construction and arrangement with respect to said ice chamber and is provided with an air vent leading from the top thereof for ventilation.

A further object of the invention is to provide the refrigerating plant with a food compartment arranged at one side of the ice chamber, by means of a partition separating them and constructed at a certain portion thereof with a dead air space so as to provide a food compartment of different temperatures.

It is also an object of the invention to provide a refrigerating plant of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that immaterial changes can be made within the scope of what is claimed without departing from the spirit of the invention.

The invention is illustrated in the accompanying drawings, wherein:

Figure 1 is a front elevation of my improved refrigerating plant,

Figure 2 is a vertical section taken on line 2—2 of Figure 1,

Figure 3 is also a vertical section taken on line 3—3 of Figure 1 through the food compartment, Figure 4 is a top plan of my improved device, Figure 5 is a horizontal section through the upper portion of the device as shown by line 5—5 of Figure 3, Figure 6 is a horizontal section taken on line 6—6 of Figure 3, and Figure 7 is a transverse sectional view on the line 7—7 of Figure 4.

Referring to the drawings 10 designates a box-like structure with spaced apart walls 11 and 12 leaving an intermediate space 13 in which insulating material is packed, as for instance shavings, the said box-like structure having door-openings, hereinafter referred to, and is supported from the floor by short legs 15. The structure is lined by galvanized sheet metal 14, and extending across the interior is a vertical partition 16, preferably located at one side of the center to provide a food compartment 17 and an ice chamber 18, the upper portion of said partition having spaced walls 20 and 21 providing a dead-air space between the upper part of the food chamber and ice chamber while the lower part 20ª of the partition is of a single thickness (see Fig. 7), whereby a much colder temperature will be maintained in the lower part of the food chamber so that articles of food can be kept therein on the shelves 19 according to refrigeration required.

Located in the forward part of the ice chamber on the bottom thereof is a chill-compartment 22 braced by uprights 23 at the inner corners thereof and connected at its outer or forward end to the front wall of the structure with additional intermediate uprights or braces 24 against the side and end walls, said chill-compartment being farther from the partition 16 than the end and rear walls of the structure so that more ice may be packed in this enlarged space. The top 25 of this chill-compartment is below the upper end of the ice chamber, to permit ice to be placed thereon as well as around the sides thereof, and said top is inclined upwardly from the sides with the ridge extending diagonally, as shown in Fig. 5 and the peak located at one of the forward corners of the compartment, with a vent tube 26 extending therefrom through the upper part of the ice chamber and top of the refrigerating plant or structure as shown in Fig. 2, whereby to ventilate said compartment, the latter being provided with horizontal shelves 27 to receive pans containing water or other material to be iced. As will be noted the lower part of the ice chamber extends around three sides of the chill-compartment, and the lower ends of these ice-receiving spaces are reinforced by a metal trough 28, U-shape in cross section and drained through the bottom of the refrigerating plant or structure by a pipe 29.

Access to the ice chamber is at the upper end thereof through an opening 30 in the top of the structure, said opening being closed by a double-walled and packed trap-door 31 hinged to one side of the opening with the sides of the door and opening beveled as usual in devices of this kind, while access to the chill-chamber and food compartment is by way of openings 34 and 35 in the front of the structure and closed by doors 32 and 33 hinged at one side of each opening, respectively, said doors and openings also being preferably beveled at their meeting edges as shown in the drawings. In the present instance the door closing the opening leading into the chill-compartment is provided with a thermometer 36 inset therein, said door having a sight-opening 37 for convenience in reading the thermometer and a recess 38 extending from the inner side thereof to receive the lower end of said thermometer and communicate with the chill-compartment for registering the temperature of the latter.

In the operation of the refrigerating plant cracked ice with an admixture of freezing salt is packed in the ice chamber around the chill-compartment and above the same through the opening covered by door 31, and the water from the melted ice collecting in the trough 28 is drained therefrom through pipe 29, which latter may be and preferably is provided with an ordinary form of trap or water-seal (not shown). The refrigerating plant may now be used for freezing water or making ice in the chill-compartment 22, and also for preserving perishable articles of food in the food compartment or preservatory 17, which latter provides for keeping articles at a very cold temperature on the shelves in the lower part thereof and other articles requiring only a moderately cold temperature in the upper part thereof, while the chill-compartment provides for making ice for household use in drinking water, etc., inasmuch as the ice in the ice chamber being mixed with salt is unfit for such purposes; the pans (indicated in dotted lines Fig. 2) in which the ice is formed being placed on the shelves 27. In addition to using the chill-compartment for making ice it may be also used for icing confections, keeping ice cream in firm condition, and for other purposes in which a freezing temperature is required. It will be obvious, therefore, that the refrigerating plant provides chambers having three different degrees of temperature, to wit: a freezing temperature in the chill-compartment, a cold temperature in the lower part of the food compartment, and a moderately cold temperature in the upper part thereof, the difference in temperature in the food compartment being produced by reason of the particular form of partition between it and the ice chamber.

From the foregoing description in connection with the accompanying drawings it will be apparent that I provide a particular construction of refrigerating plant that possesses special advantages in domestic use, for it not only provides for preserving perishable articles of food in better condition with respect to desired temperatures than an ordinary refrigerator but also provides for making ice that can be used in drinking water, beverages, etc.

Having thus described my invention, what I claim as new is:

A refrigerating plant of box-like construction with double-walled insulation providing an ice-chamber and adjoining food compartment, a partition separating them having a single wall at its lower portion and spaced apart double wall at its upper portion forming a dead air space, and a chill-compartment located in the forward part of the ice chamber on the bottom thereof and spaced farther from the aforesaid single wall of the partition than the adjoining end of the refrigerating plant or structure to form a chamber around three sides of the chill-compartment to receive an admixture of ice and freezing salt, the top of said chill-compartment being below the top of the ice chamber and inclined upwardly from each side with the ridge extending upwardly to one of the front corners thereof to communicate with a vent pipe leading out of the structure; the said refrigerating plant or structure having door-covered openings leading into the aforesaid ice chamber and compartments.

In testimony whereof, I have affixed my signature.

BELONIE CLAVETTE.